United States Patent
Berry et al.

(10) Patent No.: US 8,131,729 B2
(45) Date of Patent: Mar. 6, 2012

(54) SYSTEM AND METHOD FOR BEST-FIT LOOKUP OF MULTI-FIELD KEY

(75) Inventors: Charles Franklin Berry, Apalachin, NY (US); Glenn C. Godoy, Endwell, NY (US); Amy Jeanne Snavely, Binghamton, NY (US)

(73) Assignee: International Business Machines Corporation, Armonk, NY (US)

( * ) Notice: Subject to any disclaimer, the term of this patent is extended or adjusted under 35 U.S.C. 154(b) by 919 days.

(21) Appl. No.: 12/137,763

(22) Filed: Jun. 12, 2008

(65) Prior Publication Data

US 2009/0313216 A1 Dec. 17, 2009

(51) Int. Cl.
*G06F 7/00* (2006.01)
*G06F 17/30* (2006.01)
*G06Q 10/00* (2006.01)

(52) U.S. Cl. ........................ 707/741; 705/7.14
(58) Field of Classification Search .............. 707/741; 705/7.14
See application file for complete search history.

(56) References Cited

U.S. PATENT DOCUMENTS

| | | | |
|---|---|---|---|
| 5,774,866 A * | 6/1998 | Horwitz et al. | 705/7.14 |
| 6,047,283 A | 4/2000 | Braun | |
| 6,070,164 A * | 5/2000 | Vagnozzi | 707/100 |
| 6,594,655 B2 | 7/2003 | Tal et al. | |
| 6,782,380 B1 | 8/2004 | Thede | |
| 7,076,482 B2 | 7/2006 | Bellew | |
| 7,107,282 B1 | 9/2006 | Yalamanchi | |
| 2003/0149706 A1 * | 8/2003 | Neal et al. | 707/104.1 |

* cited by examiner

*Primary Examiner* — Wilson Lee
*Assistant Examiner* — Cheryl M Shechtman
(74) *Attorney, Agent, or Firm* — Schmeiser, Olsen & Watts; John R. Pivnichny (57) ABSTRACT

A system and associated method for looking up a best-fit record identified by a multi-field key. The multi-field key comprises multiple fields that are hierarchically organized in an order of significance in identifying a record. The system generates a set of key values that is used for a best-fit lookup of a search key value. Each value in the set of key values is specified in contiguous fields from the most significant field to a distinctive respective field. In looking up a record for the search key value, the most specific key value in the set is first compared with the search key value, and one-level less specific in the least significant field is next compared with the search key value, until the best-fit record for the search key value is found.

20 Claims, 8 Drawing Sheets

BEST-FIT LOOKUP PROCESS IN CAM
200

FIG. 1

ENTITY CONFIGURATION 340
FOR ENTITY TYPE 320 OF FIG. 1

| ENTITY KEY 3401 | | | CONFIG DATA 3402 |
|---|---|---|---|
| ATTRIBUTE 1 3401-1 | ATTRIBUTE 2 3401-2 | ... | |

EXAMPLE OF ENTITY KEY VALUE ARRAY
RESULTING FROM STEP 220 OF FIG. 2

E0  IBM~CART~EXP~MNT~IBM~US~0147

E1  IBM~CART~EXP~MNT~IBM~US~*

E2  IBM~CART~EXP~MNT~IBM~*~*

E3  IBM~CART~EXP~MNT~*~*~*

E4  IBM~CART~EXP~*~*~*~*

E5  IBM~CART~*~*~*~*~*

E6  IBM~*~*~*~*~*~*

SYSTEM AND METHOD FOR BEST-FIT LOOKUP OF MULTI-FIELD KEY

FIELD OF THE INVENTION

The present invention discloses a system and associated method for best-fit lookup of a data record that is identified by a multi-field key.

BACKGROUND OF THE INVENTION

Multi-field keys are widely used for a record that is identified by a group of values instead of a single index value. When each value for a field in a multi-field key varies independently from other fields in the multi-field key, the number of all multi-field keys that has to be distinguished to find a specific data record grows quickly as a number of available values for a field increases. As a number of records identified by the multi-field key increases, the number of multi-field keys causes data management problems and resource wastes. Also, finding a specific multi-field key becomes time consuming.

Thus, there is a need for a system and associated method that overcomes at least one of the preceding disadvantages of current methods and systems for managing a multi-field key.

SUMMARY OF THE INVENTION

The present invention provides a method for finding a best-fit record identified by a key comprising at least two fields, the method comprising:

assigning a respective level for each field of said at least two fields in the key such that the respective level of each field is distinctive and such that the respective level of each field represents a respective significance of each field in identifying the best-fit record;

subsequent to said assigning, generating a set of values for the key, wherein each value in the set is specified in a respective number of zero or more contiguous fields from the highest level;

subsequent to said generating, finding the best-fit record for a search value for the key, wherein the best-fit record is identified by a best-fit value for the key, wherein the best-fit value is a member of the generated set, wherein zero or more contiguous fields of the best-fit value from the highest level are equal to corresponding fields of the search value; and subsequent to said finding, communicating the best-fit record to a requester of the best-fit record for the search value;

wherein said assigning, said generating, said finding, and said communicating are performed by a shared service module.

The present invention provides a computer program product, comprising a computer usable medium having a computer readable program code embodied therein, said computer readable program code containing instructions that when executed by a processor of a computer system implement a method for finding a best-fit record identified by a key comprising at least two fields, the method comprising:

assigning a respective level for each field of said at least two fields in the key such that the respective level of each field is distinctive and such that the respective level of each field represents a respective significance of each field in identifying the best-fit record;

subsequent to said assigning, generating a set of values for the key, wherein each value in the set is specified in a respective number of zero or more contiguous fields from the highest level;

subsequent to said generating, finding the best-fit record for a search value for the key, wherein the best-fit record is identified by a best-fit value for the key, wherein the best-fit value is a member of the generated set, wherein zero or more contiguous fields of the best-fit value from the highest level are equal to corresponding fields of the search value; and subsequent to said finding, communicating the best-fit record to a requester of the best-fit record for the search value;

wherein said assigning, said generating, said finding, and said communicating are performed by a shared service module.

The present invention provides a computer system comprising a processor and a computer readable memory unit coupled to the processor, said memory unit containing instructions that when executed by the processor implement a method for finding a best-fit record identified by a key comprising at least two fields, the method comprising:

assigning a respective level for each field of said at least two fields in the key such that the respective level of each field is distinctive and such that the respective level of each field represents a respective significance of each field in identifying the best-fit record;

subsequent to said assigning, generating a set of values for the key, wherein each value in the set is specified in a respective number of zero or more contiguous fields from the highest level;

subsequent to said generating, finding the best-fit record for a search value for the key, wherein the best-fit record is identified by a best-fit value for the key, wherein the best-fit value is a member of the generated set, wherein zero or more contiguous fields of the best-fit value from the highest level are equal to corresponding fields of the search value; and subsequent to said finding, communicating the best-fit record to a requester of the best-fit record for the search value;

wherein said assigning, said generating, said finding, and said communicating are performed by a shared service module.

The present invention provides a process for supporting computer infrastructure, said process comprising providing at least one support service for at least one of creating, integrating, hosting, maintaining, and deploying computer-readable code in a computing system, wherein the code in combination with the computing system is capable of performing a method for finding a best-fit record identified by a key comprising at least two fields, the method comprising:

assigning a respective level for each field of said at least two fields in the key such that the respective level of each field is distinctive and such that the respective level of each field represents a respective significance of each field in identifying the best-fit record;

subsequent to said assigning, generating a set of values for the key, wherein each value in the set is specified in a respective number of zero or more contiguous fields from the highest level;

subsequent to said generating, finding the best-fit record for a search value for the key, wherein the best-fit record is identified by a best-fit value for the key, wherein the best-fit value is a member of the generated set, wherein zero or more contiguous fields of the best-fit value from the highest level are equal to corresponding fields of the search value; and subsequent to said finding, communicating the best-fit record to a requester of the best-fit record for the search value;

wherein said assigning, said generating, said finding, and said communicating are performed by a shared service module.

The present invention provides a method and system that overcomes at least one of the current disadvantages of conventional method and system for looking up records identified by a multi-field key.

DETAILED DESCRIPTION OF THE INVENTION

Figure 1:
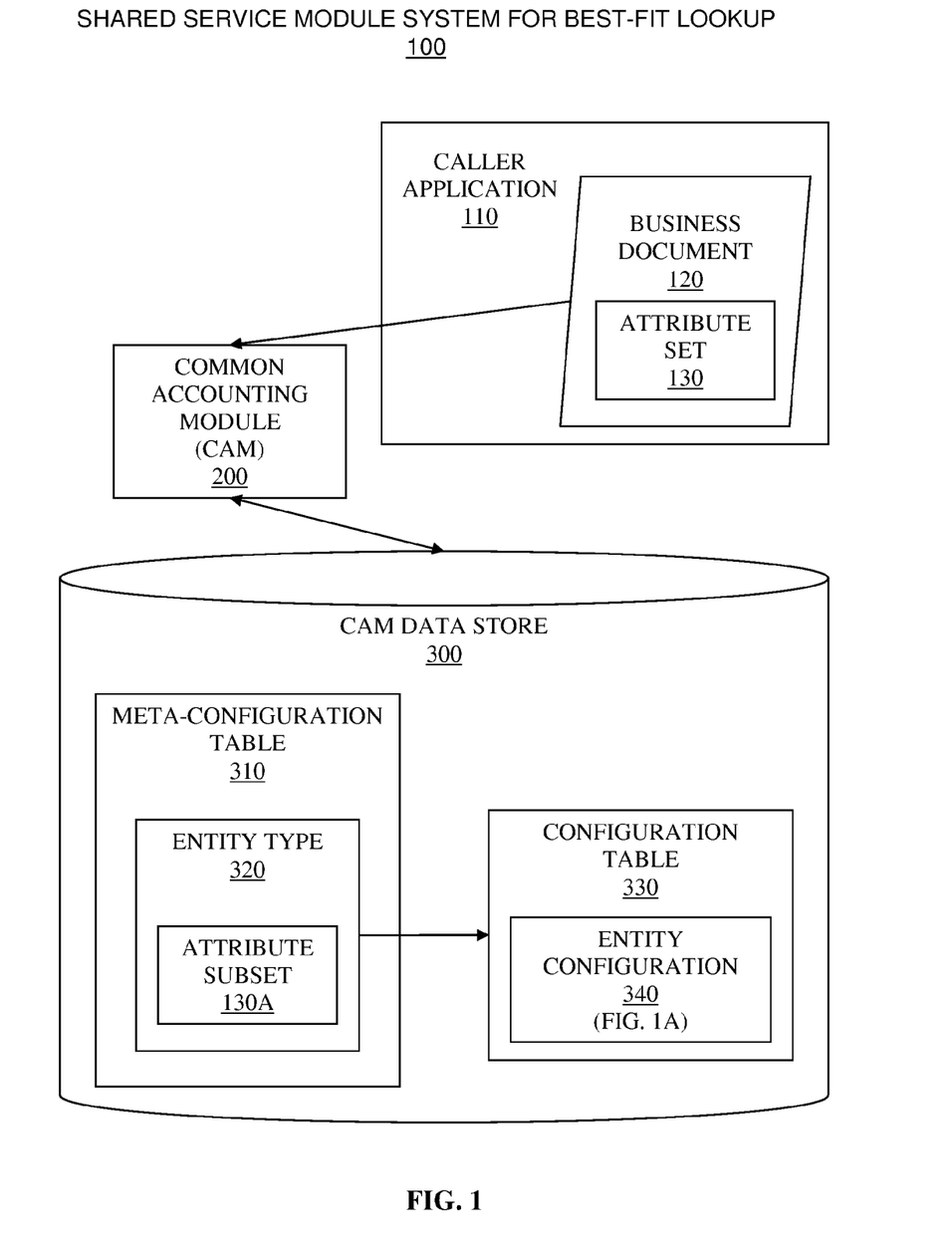
FIG. 1 illustrates a system for best-fit lookup of a multi-field key for a record in a data store of a shared service module, in accordance with embodiments of the present invention.

FIG. 1 illustrates a system 100 for best-fit lookup of a multi-field key for a record in a data store of a shared service module, in accordance with embodiments of the present invention.

The system 100 comprises at least one caller application, a shared service module, and a shared service module data store. In this embodiment, a common accounting module (CAM) 200 represents the shared service module and a common accounting module (CAM) data store 300 represents the shared service module data store.

A caller application 110 of said at least one caller application comprises a business document 120. The caller application 110 redirects a user to CAM 200 to perform a business transaction by invoking the CAM 200. An example of the caller application is, inter alia, a purchase requisition system.

The business document 120 describes the business transaction. The business document 120 comprises an attribute set 130 for the CAM 200 to determine an entity key 3401 of FIG. 1A, infra. The attribute set 130 comprises at least one attribute name associated with a respective attribute data. In one embodiment, attribute data of the attribute set 130 are interactively provided by the user through the caller application 110.

The common accounting module (CAM) 200 provides a service to the caller application 110. The CAM 200 receives the attribute set 120 and performs a best-fit lookup for an entity key built from attribute data in the attribute set 120 within the CAM data store 300.

The CAM data store 300 comprises a meta-configuration table 310 and at least one configuration table. The meta-configuration table 310 comprises at least one entity type that is defined by attributes in an attribute subset 130A. In one embodiment of the present invention, an entity type named as "Purchase Scenario" represents seven attributes of a corporation, a document type, a purchase type, an accounting purpose, a dependent corporation, a purchasing country, and a purchasing company. In the same embodiment, the entity type "Purchase Scenario" is inherent to the CAM. In the same embodiment, a system administrator of the CAM may define other entity types as necessary.

The attribute subset 130A comprises attributes selected from the attribute set 130 in the business document 120. Each entity type 320 that is defined in the meta-configuration table 310 corresponds to a respective configuration table 330 in the CAM data store 300.

Configuration exists per entity type. Data in the configuration table 330 corresponds to the entity type 320. The configuration table 330 comprises at least one entity configuration 340 that is identified by an entity key. Each entity configuration 340 comprises a respective configuration data for the entity key. See FIG. 1A, infra, for details on the entity configuration 340.

Figure 1A:
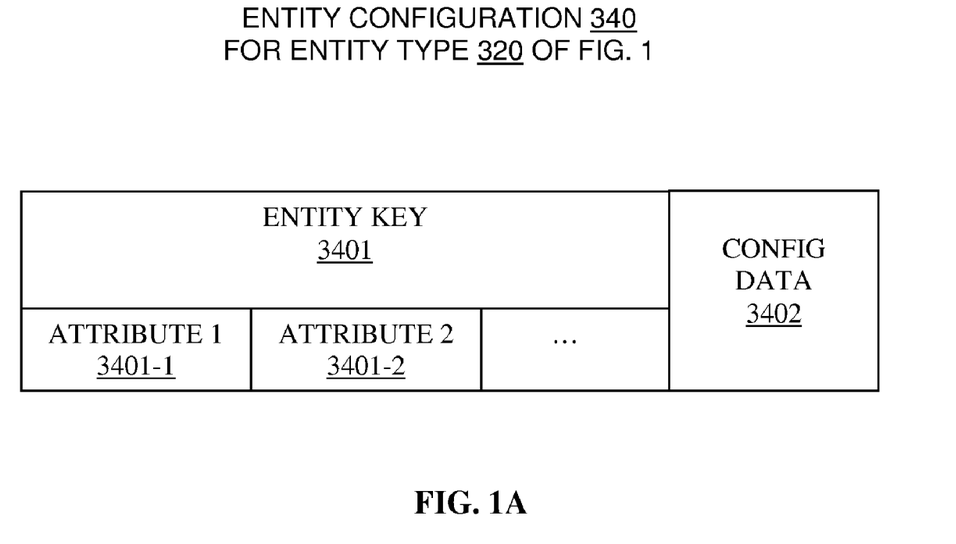
FIG. 1A illustrates an entity configuration for the entity type 320 in FIG. 1, in accordance with embodiments of the present invention.

FIG. 1A illustrates an entity configuration 340 for the entity type 320 in FIG. 1, supra, in accordance with embodiments of the present invention.

The entity configuration 340 is a data record represented as a row in the configuration table 330. The entity configuration 340 comprises an entity key 3401 and a corresponding configuration data 3402.

The entity key 3401 is a multi-field identifier for the entity configuration 340. Each field of the entity key 3401-1, 3401-2 corresponds to an attribute in the attribute subset 130A of FIG. 1, supra.

In constructing the entity key 3401, each attribute of the attribute subset 130A of FIG. 1, supra, is ranked according to a hierarchy and placed by the rank as a field within the entity key 3401. ATTRIBUTE 1 3401-1 is the most significant field within the entity key 3401 in identifying the entity configuration 340. ATTRIBUTE 2 3401-2 is next significant field within the entity key 3401 in identifying the entity configuration 340. The hierarchy is predefined by the CAM according to the significance of a field in identifying an entity configuration. In the previous example of the entity type "Purchase Scenario," FIG. 1, supra, a predefined hierarchy for the attributes is from the top rank, the corporation, the document type, the purchase type, the accounting purpose, the dependent corporation, the purchasing country, and the purchasing company. Thus, the corporation ranked at the top is the most significant field in the entity key determining an entity configuration, and the document type is the next significant field, and so on.

A value of an entity key 3401 is represented as a concatenated string of all values for respective fields separated by a delimiter. The delimiter between fields may be any special character that is not used for representing a value. The value of the entity key is valid if each field of the entity key is hierarchically instantiated, meaning that values for fields from the top rank to a certain rank are all provided without a gap in the middle. In the current embodiment, examples of valid entity key values for the entity type "Purchase Scenario" may be, inter alia, 'IBM~CART,' 'IBM~CART~EXP,' 'IBM~CART~EXP~MNT~IBM~US~0147,' etc. A value for the entity key 'IBM~CART~EXP~MNT~*~US~0147' is invalid.

The configuration data 3402 specifies configuration data for a respective value of the entity key 3401.

Figure 2:
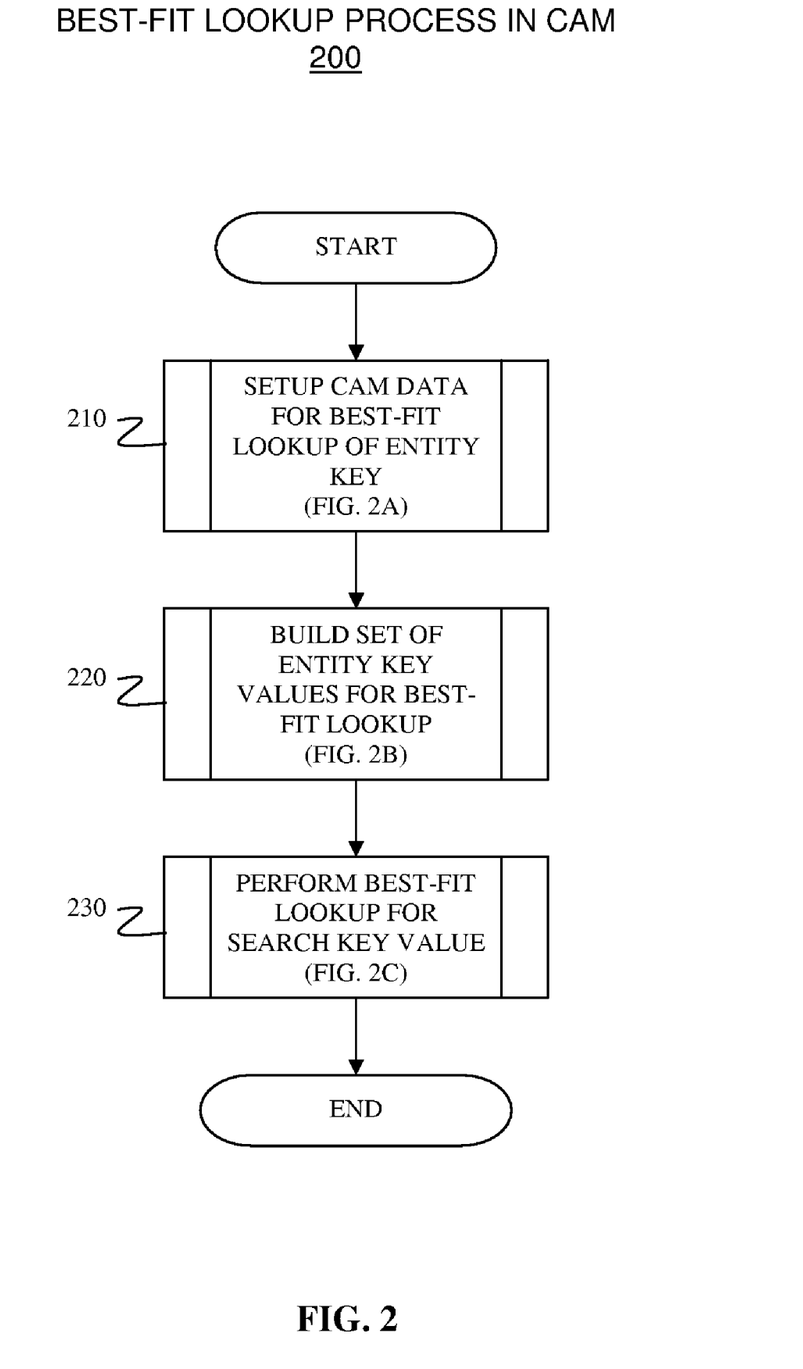
FIG. 2 is a flowchart depicting a method for best-fit lookup of hierarchical multi-field identifier, in accordance with the embodiments of the present invention.

FIG. 2 is a flowchart depicting a method for best-fit lookup of hierarchical multi-field identifier, in accordance with the embodiments of the present invention.

In step 210, the CAM sets up the CAM data to perform a best-fit lookup of an entity key among entity configurations that are uniquely identified by a multi-field entity key. See FIG. 2A, infra, for details.

In step 220, the CAM builds a set of entity key values that are used for the best-fit lookup of entity configurations. Each value in the set of values for the entity key is developed from a single instance of entity key that has been required by the business document. See FIG. 2B, infra, for details.

In step 230, the CAM searches for an entity configuration that best fits for a search entity key value in the set of entity key values from step 220. In the previous embodiment, after performing step 230, a search for an entity key value of IBM~CART~EXP~MNT~XYZ~UK~0123 finds the best-fit entity key value in the set IBM~CART~EXP~MNT~*~*~*. A record identified by the best-fit entity key value for the search entity key value represents the closest configuration data that the CAM may find in the CAM data store for the search entity key value. See FIGS. 2C and 3, infra, for details.

Figure 2A:
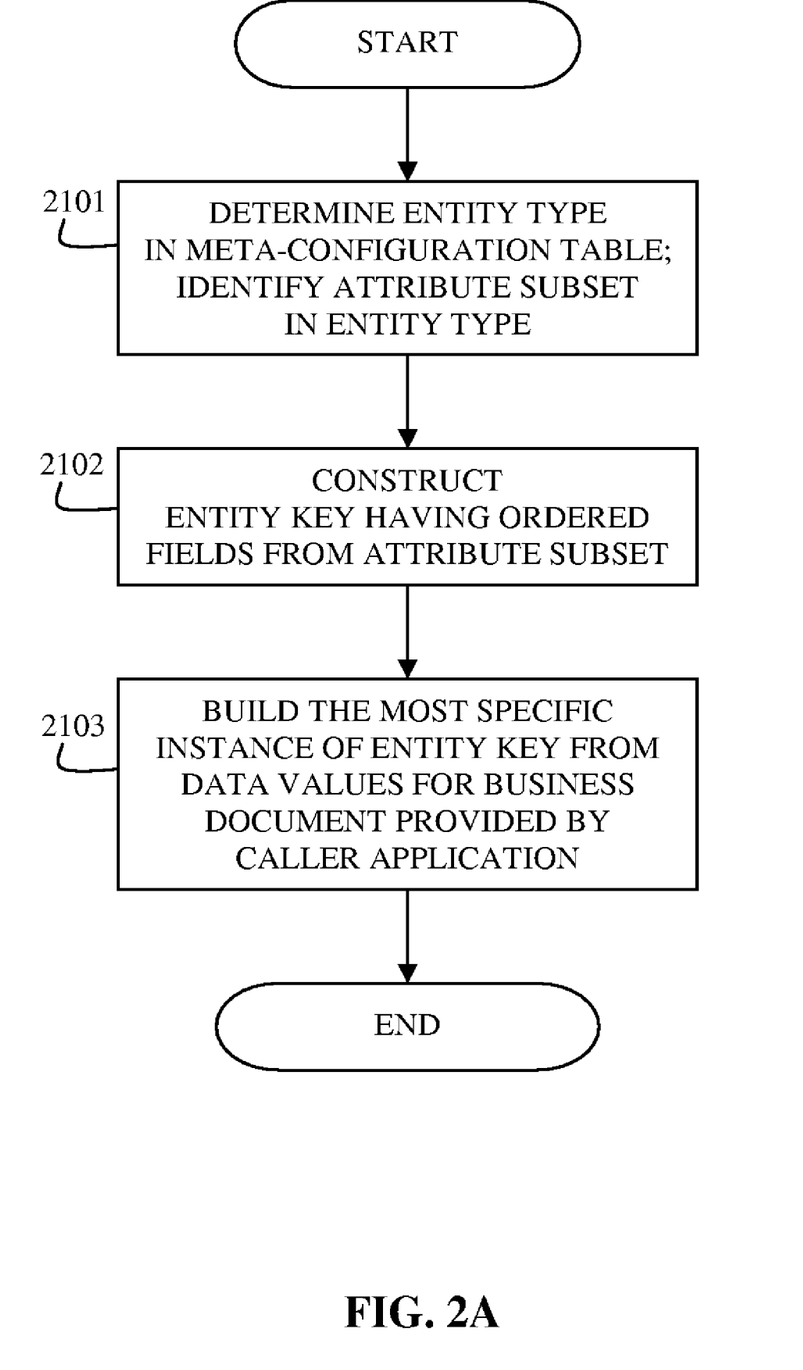
FIG. 2A is a flowchart depicting a method for building up the most specific instance of an entity key in step 210 of FIG. 2, in accordance with the embodiments of the present invention.

FIG. 2A is a flowchart depicting a method for building up the most specific instance of an entity key in step 210 of FIG. 2, supra, in accordance with the embodiments of the present invention.

In step 2101, the CAM determines an entity type for a set of attributes corresponding to data values that are comprised by a request from the caller application. The CAM determines the entity type of the entity key among entity types that are defined in the meta-configuration table. The meta-configuration table is pre-configured by a system administrator according to requirements of caller application. The entity type consequently determines a configuration table that corresponds to the entity type. The information in the located configuration table governs service requirements for the request from the caller application. Once the entity type is determined, all element attributes of the entity type are also identified. The identified element attributes are a subset of attributes specified in the request from the caller application. All attributes of the entity type are relevant in determining an entity key for a configuration record in the corresponding configuration table of the entity type.

In one embodiment of the present invention, the CAM receives, from a user input, the subset of attributes that are determined pursuant to 'Purchasing Scenario' entity type. An entity key provided by a caller application is an instance of the entity type.

In step 2102, the CAM constructs an entity key comprising at least one field by ordering element attributes identified in step 2101. Each field in the entity key corresponds to a respective element attribute from the service request provided by the caller application. The order of fields in the entity key is determined pursuant to a respective significance and/or applicability of each field in identifying the entity key in a configuration table. Consequently, fields within the entity key are ordered from the first field in descending order of significance and/or applicability in identifying a data record in the configuration table.

In step 2103, the CAM builds the most specific instance of the entity key from data values of the service request provided by the caller application. The CAM applies the order of fields determined in step 2102 on each value of respective fields from the caller application. In one embodiment of the present invention, the CAM constructs a delimited string of all attribute values that have the same order as determined in step 2102 from data values from the business document. The instance may be, inter alia, "IBM~CART~EXP~MNT~IBM~US~0147." See FIG. 3, infra, for details.

Figure 2B:
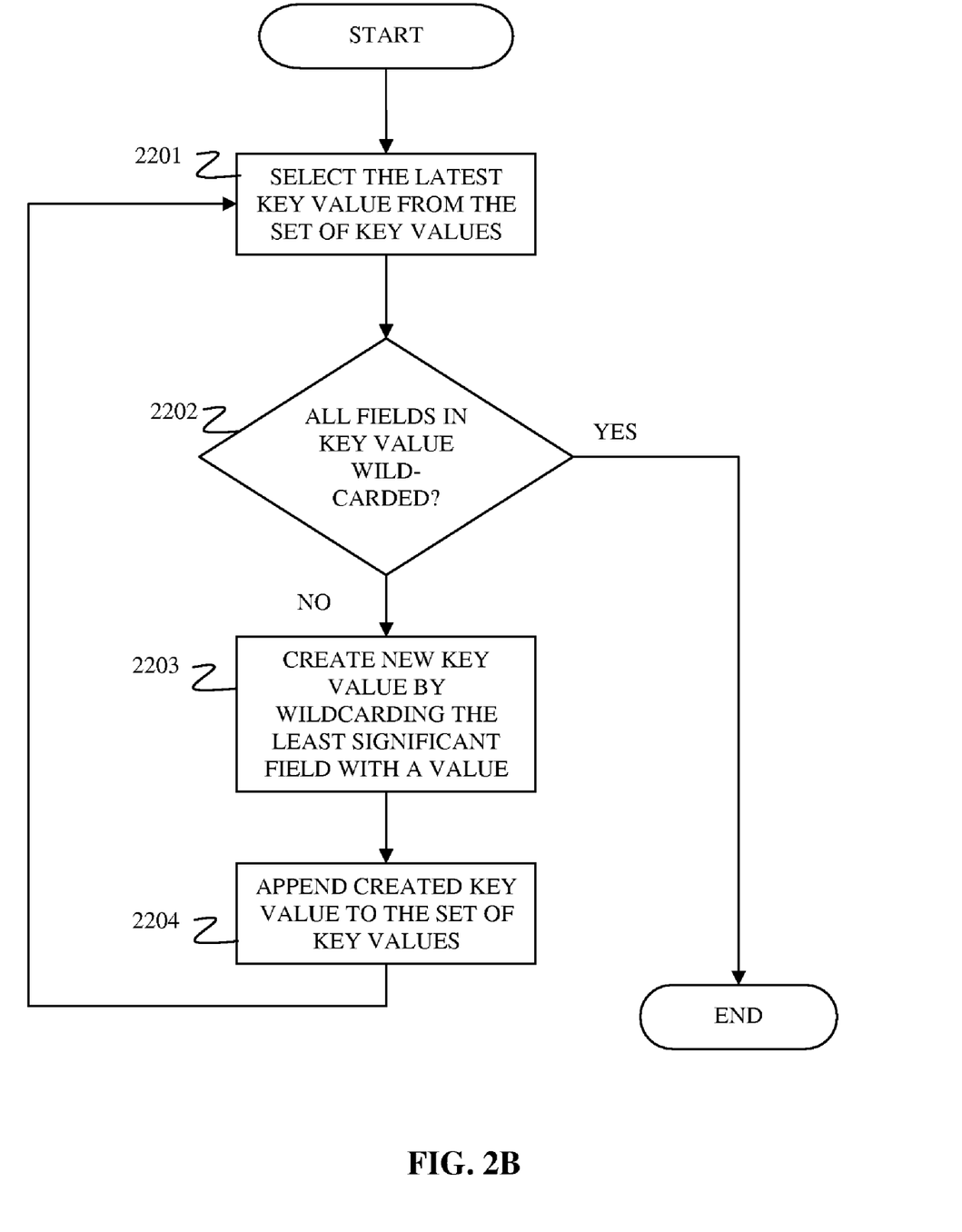
FIG. 2B is a flowchart depicting a method for building a set of entity key values in step 220 of FIG. 2, in accordance with the embodiments of the present invention.

FIG. 2B is a flowchart depicting a method for building a set of entity key values in step 220 of FIG. 2, supra, in accordance with the embodiments of the present invention.

Initially, the CAM has the most specific instance of the entity key from step 2103 of FIG. 2A, supra. The most specific instance of the entity key is a first member of the ordered set of entity key values. In one embodiment of the present invention, the ordered set is an array.

In step 2201, the CAM selects the latest member of the ordered set of entity key values. The latest member has the least specific key value among all members in the ordered set of entity key values.

In step 2202, the CAM determines whether all fields of the latest member of the ordered set of entity key values have been replaced with wildcard characters. A field replaced by a wildcard character indicates that the field can be instantiated with any data value, meaning that the field replaced by the wildcard character has no significance in searching a key value. If the CAM determines that all fields of the entity key have been replaced with wildcard characters, then the CAM proceeds with step 230 of FIG. 1, supra. Upon proceeding to step 230 of FIG. 1, supra, the CAM has the ordered set of entity key values that have members ordered from a first member that has the most specific values in all fields, the next member that has a one-field less specific value than the first member, and so on, to the last member that has no specific value in any field. The ordered set comprises progressively less specific entity key values from the first member to the last member. See FIG. 3, infra, for an example. If the CAM determines that there is a field that is not replaced with a wildcard character, then the CAM proceeds with step 2202.

In step 2203, the CAM creates a new member value of the ordered set of entity key values by replacing a specific data value with a wildcard character in the least significant field. The wildcard character can be configured to any special character that is not used in the notation of entity keys and their values. Examples of the wildcard character may be defined, inter alia, an asterisk (*), an ampersand (&), a percent sign (%), etc. However, in this embodiment, a tilde (~) cannot be used as the wildcard character because it is used as a delimiter between fields within an entity key.

In step 2204, the CAM appends the new member value created in step 2203 at the end of the ordered set of entity key values. After step 2203, the CAM loops back to step 2201.

Figure 2C:
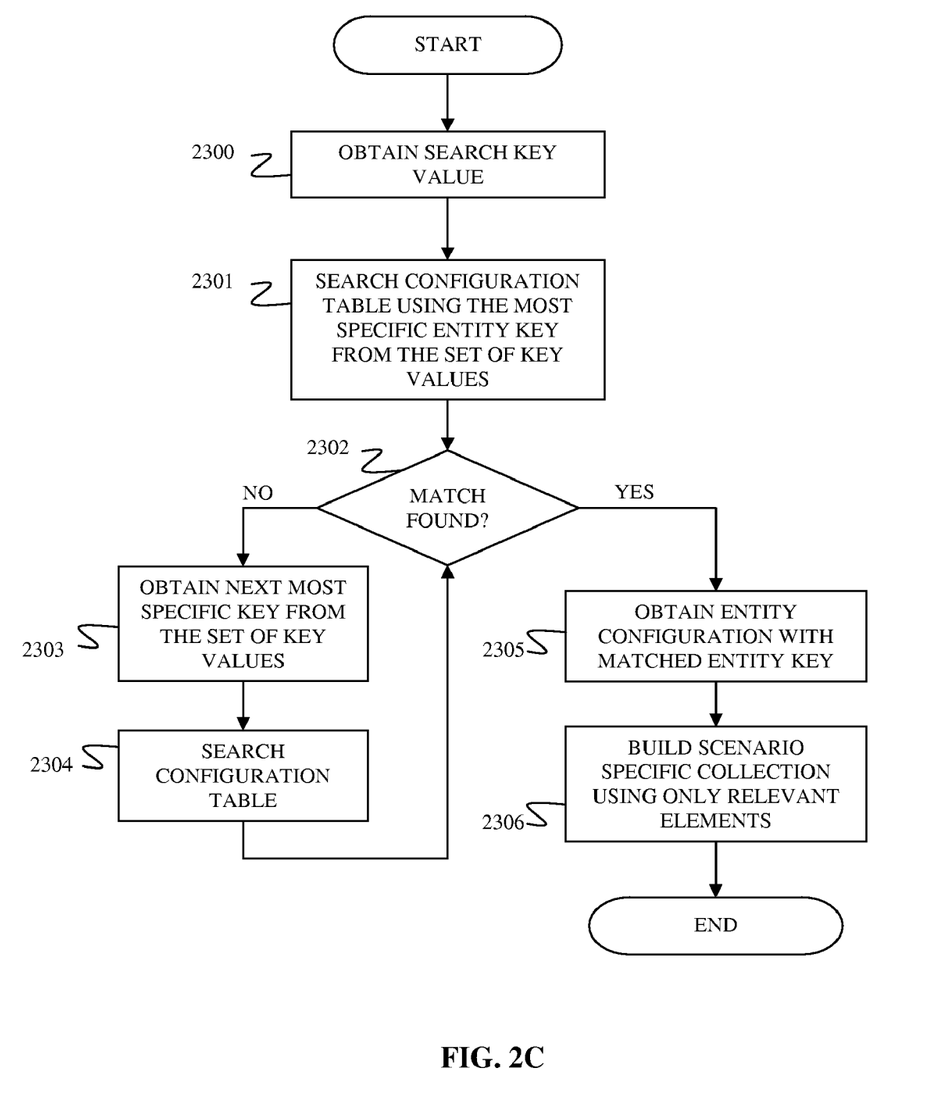
FIG. 2C is a flowchart depicting a method for performing a best-fit lookup of a search key value in step 230 of FIG. 2, in accordance with the embodiments of the present invention.

FIG. 2C is a flowchart depicting a method for performing a best-fit lookup of a search key value in step 230 of FIG. 2, supra, in accordance with the embodiments of the present invention.

In step 2300, the CAM obtains the most specific search key value built in step 2103, using data found in a business document of the caller application, from a user input, etc.

In step 2301, the CAM searches configuration tables using the most specific key value in the ordered set of key values made for the search key value. The search key value is previously provided by the caller application in the business document or by a user through interactive input.

In step 2302, the CAM determines whether an entity key that matches the search key value is found using a current key value. Because the CAM progressively searches from the most specific key value to the less specific key values, when the CAM finds a matching entity key for the first time, it is the most specific match that is referred to as a best-fit. If the CAM does not find an entity key that matches the search key value, then the CAM proceeds with step 2303. If the CAM finds an entity key that matches the search key value, then the CAM proceeds with step 2305.

In step 2303, because no match has been found yet, the CAM obtains a next key value of the ordered set of key values that is one-field less specific than the previous member in the least significant field of the entity key value. In step 2304, the CAM searches configuration tables with the obtained key value.

In step 2305, because an entity key that matches the search key value has been found, the CAM obtains a record that contains a configuration data for a matching entity key in a configuration table. In one embodiment of the present invention, a configuration data in the record of configuration table comprises, inter alia, accounting attributes, elements relevant to Purchasing Scenario entity type, associated validation algorithms, etc.

In step 2306, the CAM builds a collection of elements that are relevant to the matched configuration. Pursuant to characteristics of the data in the record, this collection of elements can be any type of data. In this embodiment, the CAM builds appropriate user interface screens containing only those accounting elements that are relevant to the specific Purchase Scenario entity key value. The CAM subsequently presents screens built and gathers further required information.

Figure 3:
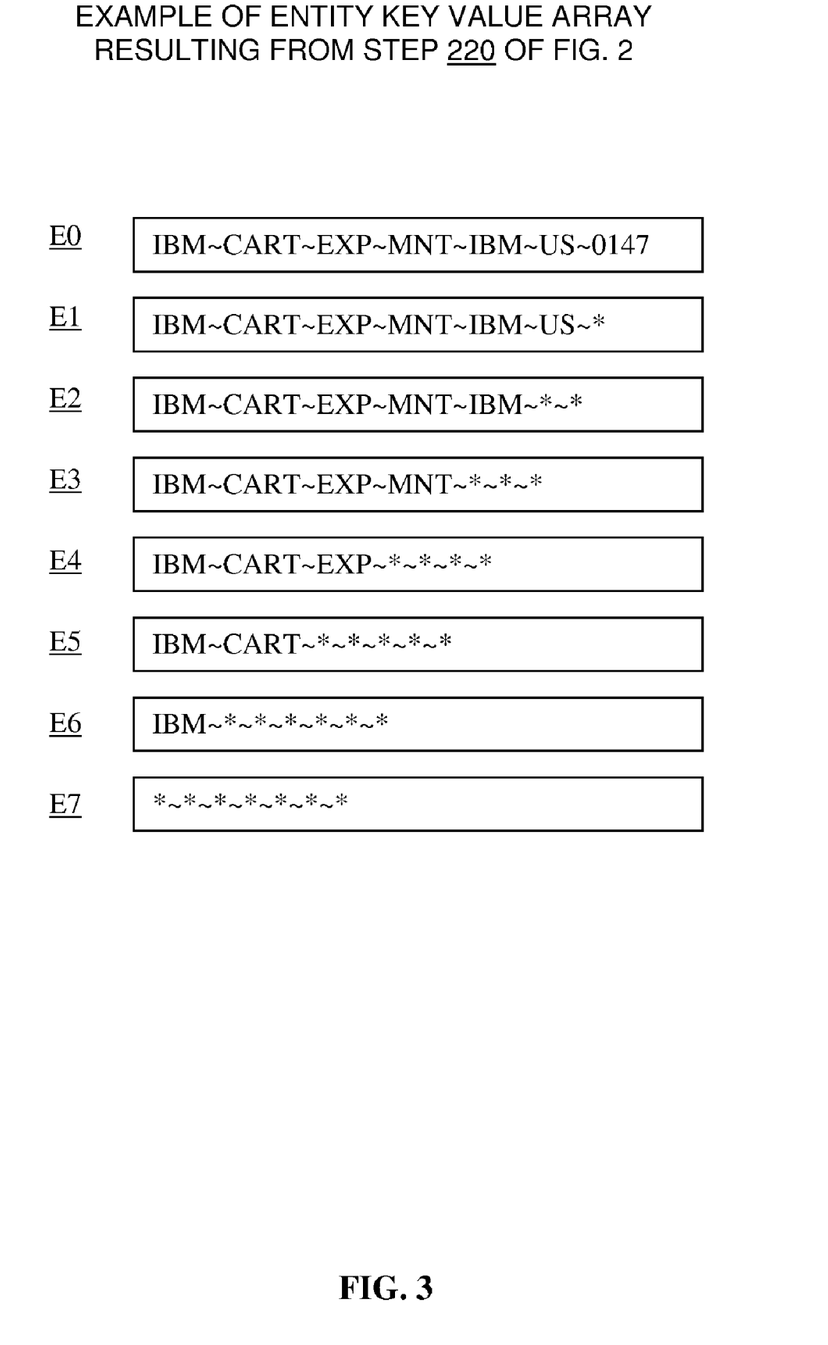
FIG. 3 illustrates an example of an array of entity key values that comprises fields hierarchically replaced by wildcard characters, in accordance with embodiments of the present invention.

FIG. 3 illustrates an example of an array of entity key values that comprises fields hierarchically replaced by wildcard characters, in accordance with embodiments of the present invention.

The entity key has seven fields that appear in the order of significance in the entity key. The first field CORPORATION is the most significant attribute in identifying the entity key PURCHASE SCENARIO. An example of a value for the first field is, inter alia, IBM. The second field DOCUMENT TYPE is the second significant attribute in identifying the entity key PURCHASE SCENARIO. An example of a value for the second field is, inter alia, CART. The third field PURCHASING TYPE is the third significant attribute in identifying the entity key PURCHASE SCENARIO. An example of a value for the third field is, inter alia, EXP. The fourth field ACCOUNTING PURPOSE is the fourth significant attribute in identifying the entity key PURCHASE SCENARIO. An example of a value for the fourth field is, inter alia, MNT. The fifth field DEPENDENT CORPORATION is the fifth significant attribute in identifying the entity key PURCHASE SCENARIO. An example of a value for the fifth field is, inter alia, IBM. The sixth field PURCHASING COUNTRY is the sixth significant attribute in identifying the entity key PURCHASE SCENARIO. An example of a value for the sixth field is, inter alia, US. Finally, the seventh field PURCHASING COMPANY is the least significant attribute in identifying the entity key PURCHASE SCENARIO. An example of a value for the seventh field is, inter alia, 0147. An example of the most specific key value for the entity key is shown as 'IBM~CART~EXP~MNT~IBM~US~0147,' which is used as a first element of the ordered set or the array of key values.

The first element of the array E0 is the most specific entity key value with all seven fields that have their respective attribute value. As shown, the first element E0 has specific value for all seven fields of CORPORATION, DOCUMENT TYPE, PURCHASING TYPE, ACCOUNTING PURPOSE, DEPENDENT CORPORATION, PURCHASING COUNTRY, and PURCHASING COMPANY.

The second element of the array E1 is one-field less specific entity key value than the first element of the array E0, wherein the first six fields have their respective attribute value but the least significant field that represents PURCHASING COMPANY attribute is replaced by a wildcard character (*). As shown, the second element E1 has specific value for six fields of CORPORATION, DOCUMENT TYPE, PURCHASING TYPE, ACCOUNTING PURPOSE, DEPENDENT CORPORATION, and PURCHASING COUNTRY, but the seventh field PURCHASING COMPANY is replaced by the wildcard character (*).

The third element of the array E2 is one-field less specific entity key value than the second element of the array E1, wherein the least significant specified field of the second element E1 that represents PURCHASING COUNTRY attribute is replaced by the wildcard character (*). As shown, the third element E2 has specific value for five fields of CORPORATION, DOCUMENT TYPE, PURCHASING TYPE, ACCOUNTING PURPOSE, and DEPENDENT CORPORATION, but the sixth field PURCHASING COUNTRY and the seventh field PURCHASING COMPANY are replaced by the wildcard characters (*).

The fourth element of the array E3 is one-field less specific entity key value than the third element of the array E2, wherein the least significant specified field of the third element E2 that represents DEPENDENT CORPORATION attribute is replaced by the wildcard character (*). The fifth element E4, the sixth element E5, the seventh element E6, and the eighth element E7 are built from their respective prior element in the array. Because the eighth element E7 has no specific value in any field of the entity key, the key may identify a default record that does not require any specific entity key value.

Figure 4:
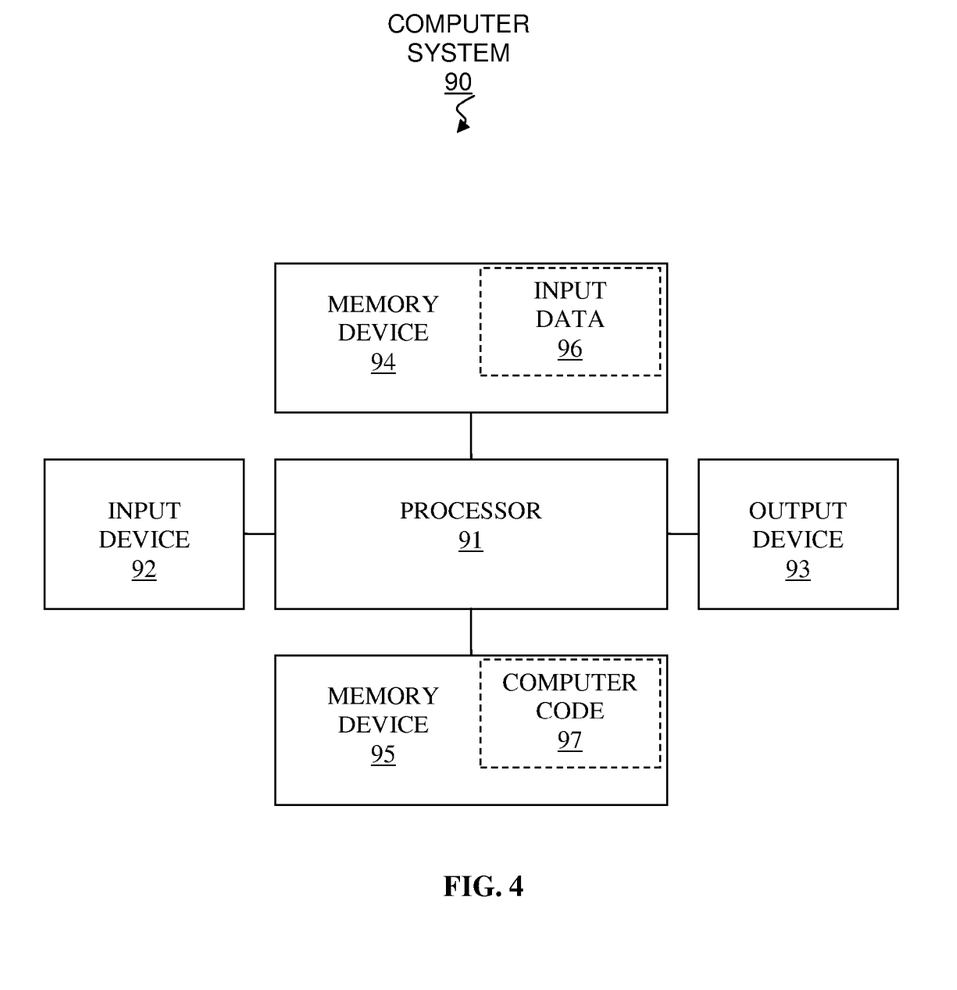
FIG. 4 illustrates a computer system used for best-fit lookup of a multi-field key, in accordance with embodiments of the present invention.

FIG. 4 illustrates a computer system 90 used for best-fit lookup of a multi-field key, in accordance with embodiments of the present invention.

The computer system 90 comprises a processor 91, an input device 92 coupled to the processor 91, an output device 93 coupled to the processor 91, and memory devices 94 and 95 each coupled to the processor 91. The input device 92 may be, inter alia, a keyboard, a mouse, a keypad, a touchscreen, a voice recognition device, a sensor, a network interface card (NIC), a Voice/video over Internet Protocol (VoIP) adapter, a wireless adapter, a telephone adapter, a dedicated circuit adapter, etc. The output device 93 may be, inter alia, a printer, a plotter, a computer screen, a magnetic tape, a removable hard disk, a floppy disk, a NIC, a VoIP adapter, a wireless adapter, a telephone adapter, a dedicated circuit adapter, an audio and/or visual signal generator, a light emitting diode (LED), etc. The memory devices 94 and 95 may be, inter alia, a cache, a dynamic random access memory (DRAM), a read-only memory (ROM), a hard disk, a floppy disk, a magnetic tape, an optical storage such as a compact disc (CD) or a digital video disc (DVD), etc. The memory device 95 includes a computer code 97 which is a computer program that comprises computer-executable instructions. The computer code 97 includes, inter alia, an algorithm used for best-fit lookup of a multi-field key according to the present invention. The processor 91 executes the computer code 97. The memory device 94 includes input data 96. The input data 96 includes input required by the computer code 97. The output device 93 displays output from the computer code 97. Either or both memory devices 94 and 95 (or one or more additional memory devices not shown in FIG. 4) may be used as a computer usable medium (or a computer readable medium or a program storage device) having a computer readable program embodied therein and/or having other data stored therein, wherein the computer readable program comprises the computer code 97. Generally, a computer program product (or, alternatively, an article of manufacture) of the computer system 90 may comprise said computer usable medium (or said program storage device).

Any of the components of the present invention can be deployed, managed, serviced, etc. by a service provider that offers to deploy or integrate computing infrastructure with respect to a process for best-fit lookup of a multi-field key of the present invention. Thus, the present invention discloses a process for supporting computer infrastructure, comprising integrating, hosting, maintaining and deploying computer-readable code into a computing system (e.g., computing system 90), wherein the code in combination with the computing system is capable of performing a method for best-fit lookup of a multi-field key.

In another embodiment, the invention provides a business method that performs the process steps of the invention on a subscription, advertising and/or fee basis. That is, a service provider, such as a Solution Integrator, can offer to create, maintain, support, etc. a process for best-fit lookup of a multi-field key of the present invention. In this case, the service provider can create, maintain, support, etc. a computer infrastructure that performs the process steps of the invention for one or more customers. In return, the service provider can receive payment from the customer(s) under a subscription and/or fee agreement, and/or the service provider can receive payment from the sale of advertising content to one or more third parties.

While FIG. 4 shows the computer system 90 as a particular configuration of hardware and software, any configuration of hardware and software, as would be known to a person of ordinary skill in the art, may be utilized for the purposes stated supra in conjunction with the particular computer system 90 of FIG. 4. For example, the memory devices 94 and 95 may be portions of a single memory device rather than separate memory devices.

While particular embodiments of the present invention have been described herein for purposes of illustration, many modifications and changes will become apparent to those skilled in the art. Accordingly, the appended claims are intended to encompass all such modifications and changes as fall within the true spirit and scope of this invention.

What is claimed is:

1. A method for searching a best-fit record identified by a key comprising n number of fields, n is a positive integer greater than one (1), the method comprising:

assigning a respective level for each field of said n number of fields in the key such that the respective level of each field is distinctive and such that the respective level of each field represents a respective significance of each field of the key in identifying the best-fit record, wherein said n number of fields of the key appears within the key in a descending order of the respective level associated with said each field;

subsequent to said assigning, generating a set of values for the key, wherein each value in the set is specified in a respective number (k) of fields among the n number of fields, wherein k is zero (0) or a positive integer, wherein the k number of fields specifying said each value are contiguous starting from a first field of the key associated with a highest level among the respective level of said each field such that said each value in the set is associated with a respective degree of specificity determined from the highest level, such that wherein k=0, a first value of said each value specifies the k number of fields is a most general value in the set, and such that wherein k=n, a second value of said each value specifies the k number of fields is a most specific value in the set;

subsequent to said generating, finding the best-fit record for a search value for the key, wherein the best-fit record is identified by a best-fit value for the key, wherein the best-fit value is a most specific member of the generated set, satisfying that each data item in the k fields of the best-fit value is respectively equal to each data item in k corresponding fields of the search value; and subsequent to said finding, communicating the best-fit record from said finding to a requester of the best-fit record for the search value, wherein the requester is a caller application;

wherein said assigning, said generating, said finding, and said communicating are performed by a service module shared among multiple caller applications comprising the requester.

2. The method of claim 1, the method further comprising:
prior to said assigning, determining data values for said n number of fields from a user input.

3. The method of claim 1, the method further comprising:
prior to said assigning, selecting said n number of fields among attributes provided in a business document generated in the caller application that requests a service to the service module such that the caller application customizes the key for the best-fit record.

4. The method of claim 1, the method further comprising:
prior to said finding, determining the search value for the key from a user input, wherein the user input is provided via the caller application coupled to the service module, and wherein the service module provides financial transaction services.

5. The method of claim 1, wherein the best-fit record is stored in more than one database tables that are accessed by the service module, wherein said more than one database tables are selected from a group consisting of a meta-configuration table, a configuration table, and combinations thereof, wherein the meta-configuration table comprises an entity type defining said n number of fields for the key in the best-fit record, and wherein the configuration table comprises configuration data corresponding to the entity type.

6. A computer program product, comprising a computer usable storage device having a computer readable program code embodied therein, said computer readable program code containing instructions that when executed by a processor of a computer system implement searching a best-fit record identified by a key comprising n number of fields, n is a positive integer greater than one (1), said searching comprising:

assigning a respective level for each field of said n number of fields in the key such that the respective level of each field is distinctive and such that the respective level of each field represents a respective significance of each field of the key in identifying the best-fit record, wherein said n number of fields of the key appears within the key in a descending order of the respective level associated with said each field;

subsequent to said assigning, generating a set of values for the key, wherein each value in the set is specified in a respective number (k) of fields among the n number of fields, wherein k is zero (0) or a positive integer, wherein the k number of fields specifying said each value are contiguous starting from a first field of the key associated with a highest level among the respective level of said each field such that said each value in the set is associated with a respective degree of specificity determined from the highest level, such that wherein k=0, a first value of said each value specifies the k number of fields is a most general value in the set, and such that wherein k=n, a second value of said each value specifies the k number of fields is a most specific value in the set;

subsequent to said generating, finding the best-fit record for a search value for the key, wherein the best-fit record is identified by a best-fit value for the key, wherein the best-fit value is a most specific member of the generated set, satisfying that each data item in the k fields of the best-fit value is respectively equal to each data item in k corresponding fields of the search value; and subsequent to said finding, communicating the best-fit record from said finding to a requester of the best-fit record for the search value, wherein the requester is a caller application;

wherein said assigning, said generating, said finding, and said communicating are performed by a service module shared among multiple caller applications comprising the requester.

7. The computer program product of claim 6, further comprising:
prior to said assigning, determining data values for said n number of fields from a user input.

8. The computer program product of claim 6, further comprising:
prior to said assigning, selecting said n number of fields among attributes provided in a business document generated in the caller application that requests a service to the service module such that the caller application customizes the key for the best-fit record.

9. The computer program product of claim 6, further comprising:
prior to said finding, determining the search value for the key from a user input, wherein the user input is provided via the caller application coupled to the service module, and wherein the service module provides financial transaction services.

10. The computer program product of claim 6, wherein the best-fit record is stored in more than one database tables that are accessed by the service module, wherein said more than one database tables are selected from a group consisting of a meta-configuration table, a configuration table, and combinations thereof, wherein the meta-configuration table comprises an entity type defining said n number of fields for the key in the best-fit record, and wherein the configuration table comprises configuration data corresponding to the entity type.

11. A computer system comprising a processor and a computer readable memory unit coupled to the processor, said memory unit containing instructions that when executed by the processor implement searching a best-fit record identified by a key comprising n number of fields, n is a positive integer greater than one (1), said searching comprising:

assigning a respective level for each field of said n number of fields in the key such that the respective level of each field is distinctive and such that the respective level of each field represents a respective significance of each field of the key in identifying the best-fit record, wherein said n number of fields of the key appears within the key in a descending order of the respective level associated with said each field;

subsequent to said assigning, generating a set of values for the key, wherein each value in the set is specified in a respective number (k) of fields among the n number of fields, wherein k is zero (0) or a positive integer, wherein the k number of fields specifying said each value are contiguous starting from a first field of the key associated with a highest level among the respective level of said each field such that said each value in the set is associated with a respective degree of specificity determined from the highest level, such that wherein k=0, a first value of said each value specifies the k number of fields is a most general value in the set, and such that wherein k=n, a second value of said each value specifies the k number of fields is a most specific value in the set;

subsequent to said generating, finding the best-fit record for a search value for the key, wherein the best-fit record is identified by a best-fit value for the key, wherein the best-fit value is a most specific member of the generated set, satisfying that each data item in the k fields of the best-fit value is respectively equal to each data item in k corresponding fields of the search value; and subsequent to said finding, communicating the best-fit record from said finding to a requester of the best-fit record for the search value, wherein the requester is a caller application;

wherein said assigning, said generating, said finding, and said communicating are performed by a service module shared among multiple caller applications comprising the requester.

12. The computer system of claim 11, further comprising:
prior to said assigning, determining data values for said n number of fields from a user input.

13. The computer system of claim 11, further comprising:
prior to said assigning, selecting said n number of fields among attributes provided in a business document generated in the caller application that requests a service to the service module such that the caller application customizes the key for the best-fit record.

14. The computer system of claim 11, further comprising:
prior to said finding, determining the search value for the key from a user input, wherein the user input is provided via the caller application coupled to the service module, and wherein the service module provides financial transaction services.

15. The computer system of claim 11, wherein the best-fit record is stored in more than one database tables that are accessed by the service module, wherein said more than one database tables are selected from a group consisting of a meta-configuration table, a configuration table, and combinations thereof, wherein the meta-configuration table comprises an entity type defining said n number of fields for the key in the best-fit record, and wherein the configuration table comprises configuration data corresponding to the entity type.

16. A process for supporting computer infrastructure, said process comprising providing at least one support service for at least one of creating, integrating, hosting, maintaining, and deploying computer-readable code in a computing system, wherein the code in combination with the computing system is capable of performing searching a best-fit record identified by a key comprising n number of fields, n is a positive integer greater than one (1), said searching comprising:

assigning, a processor of the computing system, a respective level for each field of said n number of fields in the key such that the respective level of each field is distinctive and such that the respective level of each field represents a respective significance of each field of the key in identifying the best-fit record, wherein said n number of fields of the key appears within the key in a descending order of the respective level associated with said each field;

subsequent to said assigning, generating a set of values for the key, wherein each value in the set is specified in a respective number (k) of fields among the n number of fields, wherein k is zero (0) or a positive integer, wherein the k number of fields specifying said each value are contiguous starting from a first field of the key associated with a highest level among the respective level of said each field such that said each value in the set is associated with a respective degree of specificity determined from the highest level, such that wherein k=0, a first value of said each value specifies the k number of fields is a most general value in the set, and such that wherein k=n, a second value of said each value specifies the k number of fields is a most specific value in the set;

subsequent to said generating, finding the best-fit record for a search value for the key, wherein the best-fit record is identified by a best-fit value for the key, wherein the best-fit value is a most specific member of the generated set, satisfying that each data item in the k fields of the best-fit value is respectively equal to each data item in k corresponding fields of the search value; and subsequent to said finding, communicating the best-fit record from said finding to a requester of the best-fit record for the search value, wherein the requester is a caller application;

wherein said assigning, said generating, said finding, and said communicating are performed by a service module shared among multiple caller applications comprising the requester.

17. The process of claim 16, further comprising:
prior to said assigning, determining data values for said n number of fields from a user input.

18. The process of claim 16, further comprising:
prior to said assigning, selecting said n number of fields among attributes provided in a business document generated in the caller application that requests a service to the service module such that the caller application customizes the key for the best-fit record.

19. The process of claim 16, further comprising:
prior to said finding, determining the search value for the key from a user input, wherein the user input is provided via the caller application coupled to the service module, and wherein the service module provides financial transaction services.

20. The process of claim 16, wherein the best-fit record is stored in more than one database tables that are accessed by the service module, wherein said more than one database tables are selected from a group consisting of a meta-configuration table, a configuration table, and combinations thereof, wherein the meta-configuration table comprises an entity type defining said n number of fields for the key in the best-fit record, and wherein the configuration table comprises configuration data corresponding to the entity type.

* * * * *